(12) United States Patent
Heinsman et al.

(10) Patent No.: US 11,565,490 B2
(45) Date of Patent: Jan. 31, 2023

(54) SURFACE COVERING PRODUCT, A METHOD FOR MAKING A SURFACE COVERING, AND A SERIES OF SURFACE COVERING TILES

(71) Applicant: AECTUAL HOLDING B.V., Amsterdam (NL)

(72) Inventors: Hedwig Heinsman, Amsterdam (NL); Hans Vermeulen, Amsterdam (NL); Martine De Wit, Amsterdam (NL)

(73) Assignee: AECTUAL HOLDING B.V., Amsterdam (NL)

( * ) Notice: Subject to any disclaimer, the term of this patent is extended or adjusted under 35 U.S.C. 154(b) by 0 days.

(21) Appl. No.: 16/416,080

(22) Filed: May 17, 2019

(65) Prior Publication Data
US 2019/0270268 A1    Sep. 5, 2019

Related U.S. Application Data

(63) Continuation of application No. PCT/NL2017/050751, filed on Nov. 17, 2017.

(30) Foreign Application Priority Data

Nov. 18, 2016 (NL) ..................................... 2017825
Mar. 14, 2017 (EP) ..................................... 17160794

(51) Int. Cl.
*B29D 99/00* (2010.01)
*E04F 15/14* (2006.01)
(Continued)

(52) U.S. Cl.
CPC .......... *B29D 99/0057* (2013.01); *B29C 64/10* (2017.08); *B44C 1/26* (2013.01);
(Continued)

(58) Field of Classification Search
CPC ... B33Y 10/00; B29D 99/0057; E04F 15/126; E04F 15/02
See application file for complete search history.

(56) References Cited

U.S. PATENT DOCUMENTS 1,568,012 A    12/1925    Walsh
1,832,836 A    11/1931    Pasquale
(Continued)

*Primary Examiner* — Andrew D Graham
(74) *Attorney, Agent, or Firm* — AEON Law, PLLC; Adam L. K. Philipp; David V. H. Cohen

(57) ABSTRACT

The invention provides a surface covering product, in particular a floor covering product, comprising boundary walls defining a lower face which in use faces a surface to be covered, said boundary walls having an upper face extending up to 60 cm from said lower face, said boundary walls dividing a part of said surface to be covered into at least partially enclosed surface parts and providing a boundary for at least one filling composition in said at least partially enclosed surface parts, wherein said surface covering product further comprises a base web having said boundary walls coupled to said base web for holding said boundary walls in position, and said base web comprises an upper surface below said upper face of said boundary walls, and a lower surface which in use rests on said surface to be covered, said boundary walls are coupled on top of said base web, and in use said filling composition covers said base web and at least part of said boundary walls, and wherein at least said boundary walls are formed in a three-dimensional (3D) printing process.

19 Claims, 6 Drawing Sheets

(51) Int. Cl.
*B44C 1/26* (2006.01)
*B29C 64/10* (2017.01)
*B33Y 10/00* (2015.01)
*B33Y 80/00* (2015.01)

(52) U.S. Cl.
CPC ............ *E04F 15/14* (2013.01); *E04F 15/142* (2013.01); *B33Y 10/00* (2014.12); *B33Y 80/00* (2014.12); *E04F 2290/023* (2013.01); *Y02B 30/00* (2013.01)

(56) References Cited

U.S. PATENT DOCUMENTS

| | | | |
|---|---|---|---|
| 1,900,704 A | | 3/1933 | Pasquale |
| 1,998,346 A | | 4/1935 | Vogel |
| 2,007,955 A | | 7/1935 | Cornell |
| 2,038,742 A | | 4/1936 | Joseph |
| 2,266,510 A | * | 12/1941 | Pottinger ............ B28B 19/0053 264/276 |
| 3,056,224 A | * | 10/1962 | Almy ................... D06N 7/0028 428/46 |
| 3,319,392 A | * | 5/1967 | Fitzgerald ........... E04F 13/0862 52/389 |
| 3,344,011 A | * | 9/1967 | Goozner ................ E04F 15/10 428/67 |
| 3,666,582 A | * | 5/1972 | Kauffman et al. .......................... B29D 99/0057 156/63 |
| 3,903,587 A | * | 9/1975 | Boiardi ................... E04F 15/14 29/418 |
| 3,988,187 A | * | 10/1976 | Witt ........................ E04F 15/02 156/71 |
| 4,710,415 A | * | 12/1987 | Slosberg ............ A47G 27/0231 428/48 |
| 5,185,192 A | | 2/1993 | Banus |
| 5,192,469 A | * | 3/1993 | Smalley ................. B29C 64/40 264/401 |
| 6,491,852 B1 | | 12/2002 | Sedaka |
| 2004/0022985 A1 | * | 2/2004 | Higgins ............. A47G 27/0293 428/48 |
| 2005/0116667 A1 | * | 6/2005 | Mueller ................... G09F 19/22 315/312 |
| 2013/0093115 A1 | * | 4/2013 | Masanek, Jr. ......... E04F 15/105 264/255 |
| 2013/0093116 A1 | * | 4/2013 | Masanek, Jr. ......... E04F 15/105 264/255 |
| 2014/0231616 A1 | | 8/2014 | Fitzgerald et al. |
| 2014/0302294 A1 | * | 10/2014 | Freedman ............. E04F 15/105 428/213 |
| 2015/0082738 A1 | * | 3/2015 | Austin ................... E04F 15/126 52/717.06 |
| 2016/0153190 A1 | * | 6/2016 | Doehring ........... E04F 15/02038 428/192 |
| 2016/0244980 A1 | * | 8/2016 | Urban .................... E04F 15/022 |
| 2016/0263822 A1 | * | 9/2016 | Boyd, IV ............. B29C 64/118 |
| 2017/0217088 A1 | * | 8/2017 | Boyd, IV ............. B29C 64/106 |
| 2017/0368760 A1 | * | 12/2017 | Troendle ............... B32B 27/304 |

\* cited by examiner

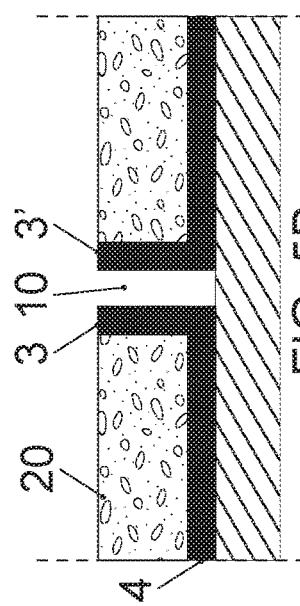
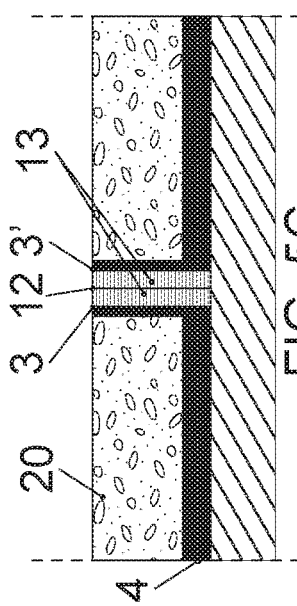
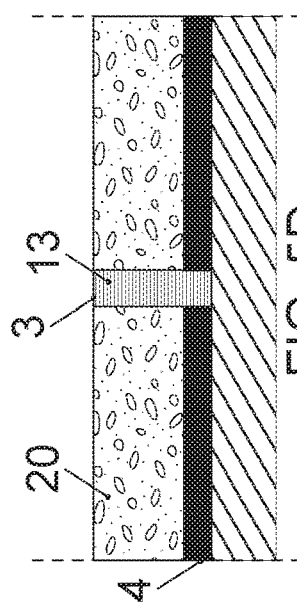
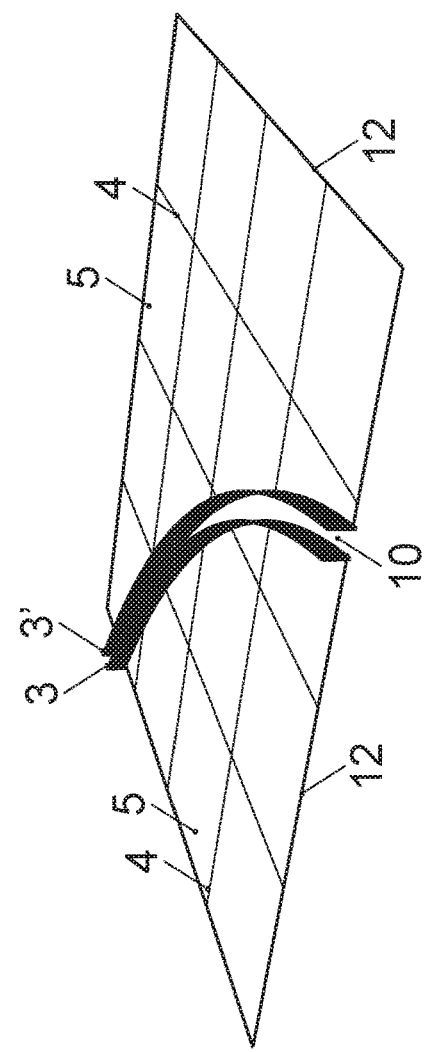

SURFACE COVERING PRODUCT, A METHOD FOR MAKING A SURFACE COVERING, AND A SERIES OF SURFACE COVERING TILES

FIELD OF THE INVENTION

The invention relates to a surface covering product, a surface covering method, and a series of surface covering tiles.

BACKGROUND OF THE INVENTION

Many surface covering products and methods have been proposed over the decades. An example of a surface covering method and system provide walls that divide the surface up into surface parts, in particular enclosed surface parts.

Such a system and method can in general be a so called "grass tile" that can be used outdoors. The open tiles allow grass to grow in the enclosed surface parts, or may hold pebbles.

Another known example of such a method and system provide a terrazzo floor covering. Many systems and methods have been proposed though the decades for making and providing a terrazzo floor. In most of these publications, like for instance U.S. Pat. No. 1,568,012 of 1924, U.S. Pat. Nos. 1,832,836, 1,900,704, 1,998,346, 2,007,955, 2, 038,742, and 5,185,192 focus on providing (mostly metal) strips for providing the boundary walls. All these boundary walls need to be places one by one and by hand.

Other way of producing a terrazzo floor or similar floor rely on for instance machining a solid plate of aluminium that only leaves the boundary walls standing. Other systems and methods provide metal grids having the boundary walls attached to them, where after placement first the metal grid is removed by grinding it away, leaving only the boundary walls standing.

U.S. Pat. No. 3,903,587 provides a specific "divider strip" that simplifies introduction of a dilatation joint or expansion joint using metal strips.

More recently, U.S. Pat. No. 6,491,852 provides "design inlays" for a terrazzo floor.

All the proposed systems and methods for making an ornamented terrazzo floor are time-consuming, labour intense, costly, unprecise, material inefficient and/or cause a waste of material.

US2016/244980 in its abstract refers to: "A method for manufacturing a flooring or a coating with an inlay pattern on a substrate is disclosed which includes: a) preparing one or more inlays with an inlay material by an additive manufacturing process using a digital fabricator on the substrate at a predetermined position or predetermined positions, or on a second substrate different from the substrate to be provided with the flooring or coating; and b1) applying a curable flooring composition on the portions of the substrate not covered by the one or more inlays prepared, and curing the flooring composition, or b2) preparing a flooring by an additive manufacturing process, or b3) applying a curable coating composition on the substrate and the one or more inlays, and curing the coating composition."

US2014/231616 in its abstract describes: "A formliner, sheet, system, and methods of use and manufacture are provided in order to provide a product that can minimize and/or eliminate visible seaming between interconnected formliners during fabrication of a pattern on a curable material. In some embodiments, the formliner can comprise raised sections that define interrelated inner and outer dimensions. Thus, a plurality of formliners can be interconnected by overlaying raised sections thereof. Further, the formliner can comprise one or more detents and one or more protrusions to enable engagement between interconnected formliners without requiring adhesives. In this manner, formliners can be interconnected in a nested manner such that visible seaming between the interconnected formliners is reduced and/or eliminated." These relate to decorative masonry and regular patterns.

SUMMARY OF THE INVENTION

It is an aspect of the invention to provide a system, method and tiles that are easy to produce. Further or alternatively, less waste is produced. Further or alternatively, the production time required is reduced. Further or alternatively the time required for assembly is reduced.

To that end, there is provided a surface covering product, in particular a floor covering product, comprising boundary walls defining a lower face which in use faces a surface to be covered, said boundary walls having an upper face extending up to 60 cm from said lower face, said boundary walls dividing a part of said surface to be covered into at least partially enclosed surface parts and providing a boundary for at least one filling composition in said at least partially enclosed surface parts, wherein said surface covering product further comprises a base web having said boundary walls coupled to said base web for holding said boundary walls in position, and said base web comprises an upper surface below said upper face of said boundary walls, and a lower surface which in use rests on said surface to be covered, said boundary walls are coupled on top of said base web, and in use said filling composition covers said base web and at least part of said boundary walls, and wherein at least said boundary walls are formed in a three-dimensional (3D) printing process.

There is further provided a method for making a surface covering, wherein a lay-out of said boundary walls is designed, the surface to be covered is divided into surface sections determining individual tiles, a set of tiles is designed of providing a tessellation of said surface to be covered, and said set of tiles is 3D printed.

There is further provided series of surface covering tiles for tessellation of a surface, wherein said surface covering tiles comprise a base web for application on a surface, and boundary walls extending from said base web.

It was found that using an additive manufacturing process, in particular a 3D printing process, allows forming individual boundary walls that provide a freedom to design surface coverings that have complex designs, patterns, and/or non-repeating elements. Thus, the enclosed areas or enclosed surface parts can have an irregular shape, or can comprise or consist of be one or more non-repeating elements, for instance. And yet, the surface covering is easy to make as the boundary walls can be produced in a simple and fast and accurate manner.

In many embodiments, the boundary walls provide a separation between different filling compositions that are used in the surface covering product.

Enclosed areas or regions that are at least partially bounded by the boundary walls are filled with a filling composition. Such a filling composition may be granular in nature, or for instance be a filling mass that flows and fills the enclosed area. The filling composition can also be distributed in other ways to fill the enclosed areas.

The filling composition can be a setting composition, like cement or concrete or the like. Another optional setting composition comprises a hardening polymer composition, resulting in a filling composition which after application comprises a thermo-hardened or radiation-hardened composition. An example of such a filling composition is for instance a composition comprising an epoxy-functional component, or similar compositions. Alternatively, the filling composition can be a solidifying composition, for instance a material like melted thermoplastic polymer. The filling composition can comprise all sorts of additives and for instance filling particles that provide an optical effect, like for instance flakes, spheres, arbitrarily shaped particles, reflecting or transparent or translucent particles. An example is terrazzo filling material.

The filling material may also comprise granular particles like pebbles that are kept and maintained in the enclosed area by the boundary walls. Also, for instance sods of grass held in a boundary wall.

A current boundary wall can be produced using an additive manufacturing technology. Material used in such a production process can be a thermoplastic material, for instance polyethylene, polypropylene, Acrylonitrile butadiene styrene (ABS) or the like. Alternatively, setting materials may be used, like setting polymer compositions, concrete, ceramic compositions, and the like. Other materials may also be used, like 3D printed metal. Also, the same material in different colors can be combined, or different materials can be combined in the same manufacturing process.

The technique used for producing the boundary walls and/or, if present, a base web layer, is broadly indicated as additive manufacturing. In general, additive manufacturing or 3D printing can be defined as a manufacturing process that builds layers to create a three-dimensional object from a digital model, or as the action or process of making a physical object from a three-dimensional digital model, typically by laying down many thin layers of a material in succession.

Fused deposition modelling (FDM) is an example of an additive manufacturing technology commonly used for modelling, prototyping, and production applications. It is one of the techniques used for 3D printing. This is also indicated as fused filament fabrication (FFF). It is also sometimes called Plastic Jet Printing (PJP)

FDM works on an "additive" principle by laying down material in layers. A large number of additive processes are available. The main differences between processes are in the way layers are deposited to create parts and in the materials that are used. Some methods melt or soften the material to produce the layers, for example. Selective laser melting (SLM) or direct metal laser sintering (DMLS), selective laser sintering (SLS), fused deposition modelling (FDM), or fused filament fabrication (FFF), while other techniques cure liquid materials using different sophisticated technologies, such as stereo lithography (SLA).

In the current description and claims, the features "surface to be covered" and "surface" are used. In this respect, the surface to be covered refers to the location where the surface covering product, method and tile are used. It refers for instance to a floor in a building or part of said floor. The current invention can for instance be used to cover a floor in a hall, airport terminal, meeting room, or a public space in a building. In such a "surface to be covered". The current invention provides many advantages that are or will be explained.

Alternatively, a surface to be covered may relate to a wall of a building. In an embodiment, the surface to be covered comprises a (part of) a floor and (a part of) a adjacent wall, creating a continuous surface covering with new design options. Applying the filling composition may there be more complicated. In this respect, plaster may be considered as filling composition.

Alternatively, the surface to be covered may refer to an outdoor location.

The "surface" refers to a physical surface. The surface covering product is in contact and rests on that surface or physical surface. Such a surface may be the surface of for instance an underfloor. In an embodiment, even a poured concrete floor.

The indications when used in the description that in an embodiment can be co-formed in the production process can in an embodiment be human readable or machine readable. In an example, such an indication can have a color, or can represent a code, number, or have a specific shape.

An indication that is machine readable can represent a bar code, QR code or may include for instance an RFID (radio-frequency identifier).

In an embodiment, the surface covering product comprises a base web having said boundary walls coupled to said base web for holding said boundary walls in position.

The base web in an embodiment comprises a layer that can be applied onto the surface of the surface to be covered. The base web in another embodiment can form an open structure. The base web can form a web, or can for instance form a grid. When the filling composition is applied onto the base web, the filling composition and a side of the base web facing the surface may thus contact the surface of the surface to be covered. In another embodiment, the lower end of the boundary walls extends below the base web. When positioned on a surface of the surface to be covered, the lower ends of the boundary walls rest on the surface, and a lower side of the base web that faces the surface is spaced from the surface. Thus, in fact the base web mainly functions for holding the boundary walls in place and in position. When the filling composition is applied, the base web can be completely enclosed by the filling composition.

In an embodiment, the boundary walls are attached to said base web. In this way, the base web can be applied onto the surface of the surface to be covered, and the boundary walls are already at their right positions.

In an embodiment, the boundary walls have an upper end and said base web extends up to below said upper end. Thus, when the filler composition is applied in a layer, the filler composition will cover the base web, allowing the boundary walls to be just below, at or above a surface of the filler composition.

In an embodiment, the base web is formed in said 3D printing process for forming said boundary walls. Thus, forming of the base web and the boundary walls can be formed as one part. The boundary walls and the base web in such a process can be produced from the same material.

In an embodiment, the base web is provided and the boundary walls are 3D printed on said base web. In such an embodiment, the base web may be provided for instance on a roll. The boundary walls in such an embodiment may be of a different material then the base web.

In an embodiment, the boundary walls are part of tiles that are formed in said 3D printing process. Thus, it allows forming individual tiles that allow tessellation of the surface to be covered. Thus complex end even non-repeating designs may be formed.

In an embodiment, the tiles have borders where in use the tiles neighbour further, similar tiles, wherein at said borders boundary walls continue from one tile to a next. A design having continuing boundary walls may be divided into tiles that can be produced individually.

In an embodiment, at said borders said boundary walls comprising wall coupling provisions for coupling said boundary walls of neighbouring tiles. The coupling allows for instance to prevent filling composition to flow beyond the boundary wall.

In an embodiment, the surface to be covered is divided into surface sections. The boundary walls are part of tiles that are formed in the 3D printing process. A tile perimeter of each of said tiles forming a—or the—border is formed according one of said surface sections for allowing forming a set of tiles covering said surface to be covered. In an embodiment, the tiles form a tessellation of said surface to be covered.

In an embodiment, at least part of the tiles comprise a position indication indicating a position of said tile on said surface to be covered. In particular when each tile is individually formed and thus may have its unique position, application of the tiles is made easier.

In an embodiment, the indication is a visual indication. More in particular, the indication is a visual indication formed in said 3D printing process forming said boundary walls. In this way, in one production process the indication may be co-formed. It may be possible to use a different material or for instance a different color for the indication. In an embodiment, the indication is positioned such that the filling composition covers the indication out of sight below the filling composition. In particular, the position indication has a top surface which is below the upper surface of the boundary walls.

In an embodiment, the tiles comprise a base web part having said boundary walls attached to said base web part.

In an embodiment, at least part of the at least partially enclosed surface parts comprise a filling code provision, said filling code provision indicating a filling composition to be used for filling said enclosed surface part. The filling code in an embodiment is 3D printed together with the base web, and/or the boundary walls. In particular, the filling code has a top surface which is below the upper surface of the boundary walls.

In an embodiment, the filling code comprising a visual indication formed in said 3D printing process. More in particular, the filling indication is integrated in said base web. The filling indication may for instance be 3D printed in the color of the filling composition that should be applied at that position, making it easy to select the right filling composition and preventing errors.

In an embodiment, the boundary walls form a series of enclosed surface parts. The boundary walls in many applications remain visible in the finished surface covering product, In particular, the boundary walls may form a design. Such a design may form a pattern. Alternatively, the current system and method allow a complex design, for instance having non-regular elements.

In an embodiment, a said boundary wall forms at least one tile border of a said tile.

In an embodiment, the tiles comprise tile coupling provisions for coupling tiles together. Such a coupling may be complementary snap parts, or other provisions that allow tiles to be locked or attached to one another.

In an embodiment, the tile coupling provisions provide matching boundary walls at tile perimeters. Thus, a series of tiles can provide one or more continuous boundary walls that run over several tiles. These boundary walls in particular can be matched and coupled together to prevent filling composition that is applied at one side of a boundary wall to flow to the opposite side at the boundary wall end at the border of a tile.

In an embodiment comprising the base web, the system further comprises an indication that is 3D printed on said base web while printing said boundary walls, for indicating where and how tubes or lines of a floor heating should be positioned.

In an embodiment of the surface covering product it further comprises floor heating coupling provisions for a floor heating tube or a floor heating wire, in particular floor heating coupling provisions having clamping provisions for clamping a floor heating tube or a floor heating wire in a predefined position with respect to said boundary walls and/or on said base web if present, wherein said coupling provision are 3D printed together with said boundary walls and/or said base web, more in particular 3D printed attached to said boundary walls and/or said base web.

In another embodiment, the base web may comprise indications, for example lines or curves to indicate where tubes or wires for floor heating and/or cooling systems should be placed. The indications may be printed with a material in another color, or another material. Additionally, the indicating lines or curves, or other parts of the base web, may comprise provision to easily mount the tubes or wires to the base web.

The invention further relates to a surface covering product comprising a series of tiles comprising at least one tile comprising an ornament extending from said tile, wherein said series of tiles are produced using an additive manufacturing process.

After the filling composition is applied, often a post-processing action is required, including grinding or polishing of the surface of the filling composition. This can make the upper end of the boundary walls visible, revealing a design.

The invention further relates to a method for producing a surface covering for a surface to be covered, comprising providing a series of tiles comprising a base web and ornaments extending from said base web, tiling at least part of said surface to be covered with said tiles, applying a filling composition over said tiles, said filling composition covering said base web out of sight and allowing said ornaments to be made visible in said surface covering.

In an embodiment, the ornaments extend at least up to a surface of said filling composition.

In another embodiment, the ornaments extend to just below a surface of said filling composition. In such en embodiment, the ornaments may be made visible after grinding or polishing the surface of the filling composition.

The invention further pertains to a method for producing a surface covering product, comprising a computer program product which, when running on a computer system, provides a surface design environment allowing a user to design a surface covering comprising selecting one or more filling compositions, defining at least one selected from one or more boundary walls providing a separation of filling composition, visible ornaments, and a combination thereof, wherein said computer program product further provides, based upon said design, production instructions for a 3D printing device for producing a series of tiles comprising a base web holding said one or more boundary walls providing a separation of filling composition, visible ornaments, and a combination thereof, said series of tiles when produced and applied allow application of said selected one or more filling compositions for forming said designed surface covering.

The invention further relates to a surface covering product comprising boundary walls defining a lower face which in use faces a surface to be covered, said boundary walls extending up to 60 cm from said lower face, said boundary walls dividing a part of said surface to be covered into at least partially enclosed surface parts and providing a boundary for at least one filling composition in said at least partially enclosed surface parts, wherein said boundary walls are formed in a three-dimensional (3D) printing process.

The term "substantially", such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterising features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 5B-5D several embodiments for providing an expansion joint, based upon the spaced boundary walls of FIG. 5A, and FIG. 6 boundary wall parts with position indications.

The drawings are not necessarily on scale.

DESCRIPTION OF PREFERRED EMBODIMENTS

In the following detailed description of the drawings, several embodiments of a surface covering product and method are explained.

As explained above, the current surface covering product, method or tile can be used in many different configurations. In the description of preferred embodiments that follows below, some of these configurations are discussed. One or more of the features discussed in one embodiment may be combined with features discussed in other embodiments. In general, the surface covering product comprises elements like boundary walls and ornaments that are applied onto a surface of the surface to be covered, and subsequently (or even during application) one or more filling compositions are applied on the surface to be covered, covering the elements completely or almost completely.

Figure 1:
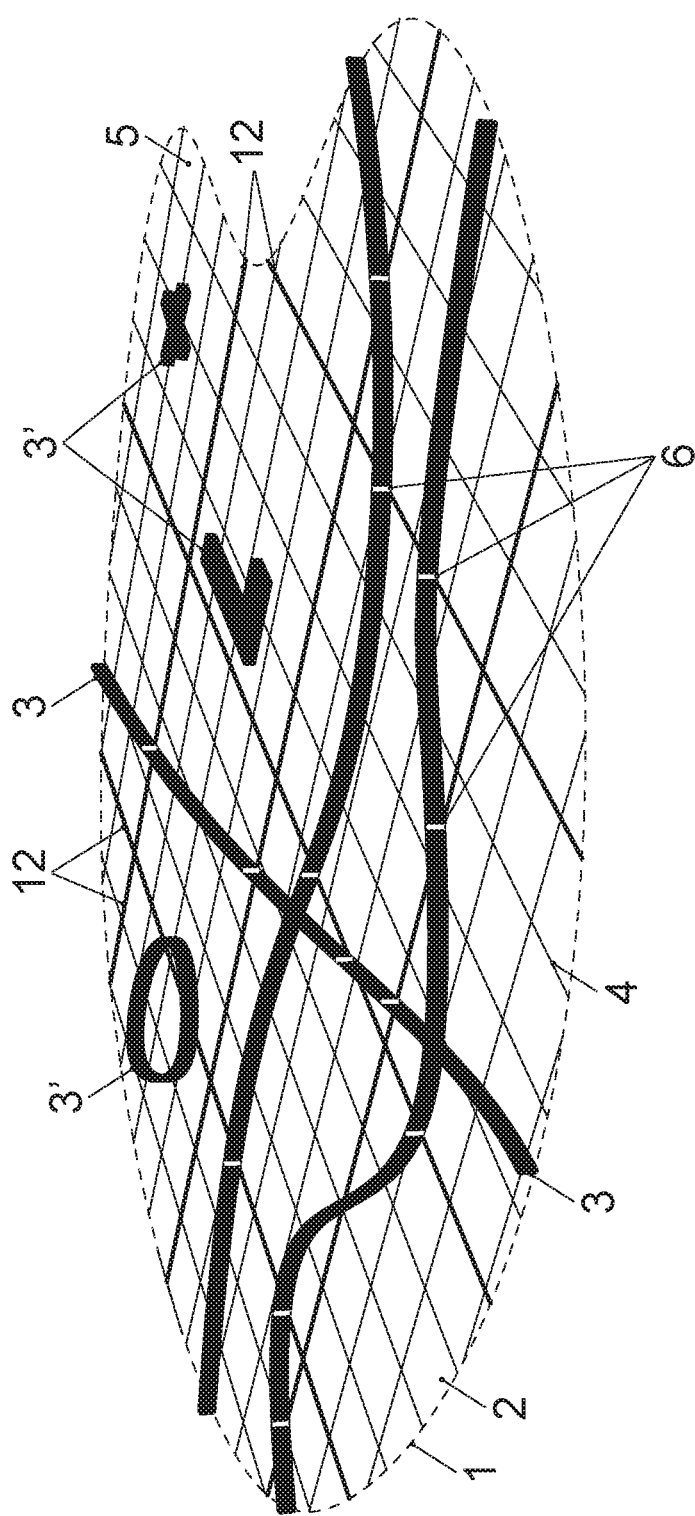
FIG. 1 a schematic overview of part of a surface with an example of a surface covering product.

In FIG. 1, a schematic perspective view of one embodiment is depicted. Showing part of a surface to be covered 1. Here, the surface to be covered may be a floor. Such a surface to be covered 1 can be a floor in a building, for instance a floor in a room, a hall, or the like. Such a floor area can be large, for instance a hall in a train station, an office hall, or the like. Such a floor covering system can for instance be part of a terrazzo floor. In such an example, the filling composition is a terrazzo filling composition. Other filling materials are also possible. Alternatively, as already explained, the surface covering product can also be an outdoor surface covering. In fact, the surface covering product may even be applied to walls or other non-horizontal surfaces.

The surface covering product is provided on the surface 2 of the surface to be covered 1. Here a floor surface 2. The surface 2 may for instance be provided by a screed or (sand) cement floor.

The surface covering product has boundary walls 3 that are here coupled to a lower layer or base web 4. In the current embodiment of FIG. 1, the surface covering product is divided into tiles 5. These tiles 5 cover the surface area 1, providing a tessellation of the surface area 1. As explained above, in an embodiment the surface area is divided up into surface sections, and tiles 5 are designed that correspond to these surface sections. These tiles can all have different perimeters, and provide a complete tessellation of the surface to be covered 1.

The boundary walls 3 here have outer ends 6 at the outer perimeters of the tiles 5. This is here done in such a way that when the tiles 5 are properly placed on the surface area, the outer ends 6 of boundary walls connect to other outer ends 6 of boundary walls 3 of neighbouring tiles 5. Using a 3D printing process, the differently shaped tiles 5 can be formed. The area between boundary walls is filled with a filling composition 20. In FIG. 1, the filling composition is not shown. The area between boundary walls 3, also referred to as enclosed surface parts, can be completely enclosed by boundary walls 3. Alternatively or additionally, an enclosed surface part may be enclosed by boundary walls 3 and for instance an end of the surface, for instance a wall in case the surface is a floor, or another building part, may provide an alternative, additional enclosure of the enclosed surface. In FIG. 1, as an example a surface part that is completely enclosed by a circular boundary wall 3' is shown. In an embodiment, the space enclosed by a boundary wall 3' can also be filled with the 3D printing material from which the boundary wall 3' is made, or other 3D printing material thus acting as filling composition (cross). This can be done during manufacturing of the boundary walls 3' in the same manufacturing process and for instance by the same 3D printing device.

Figure 2:
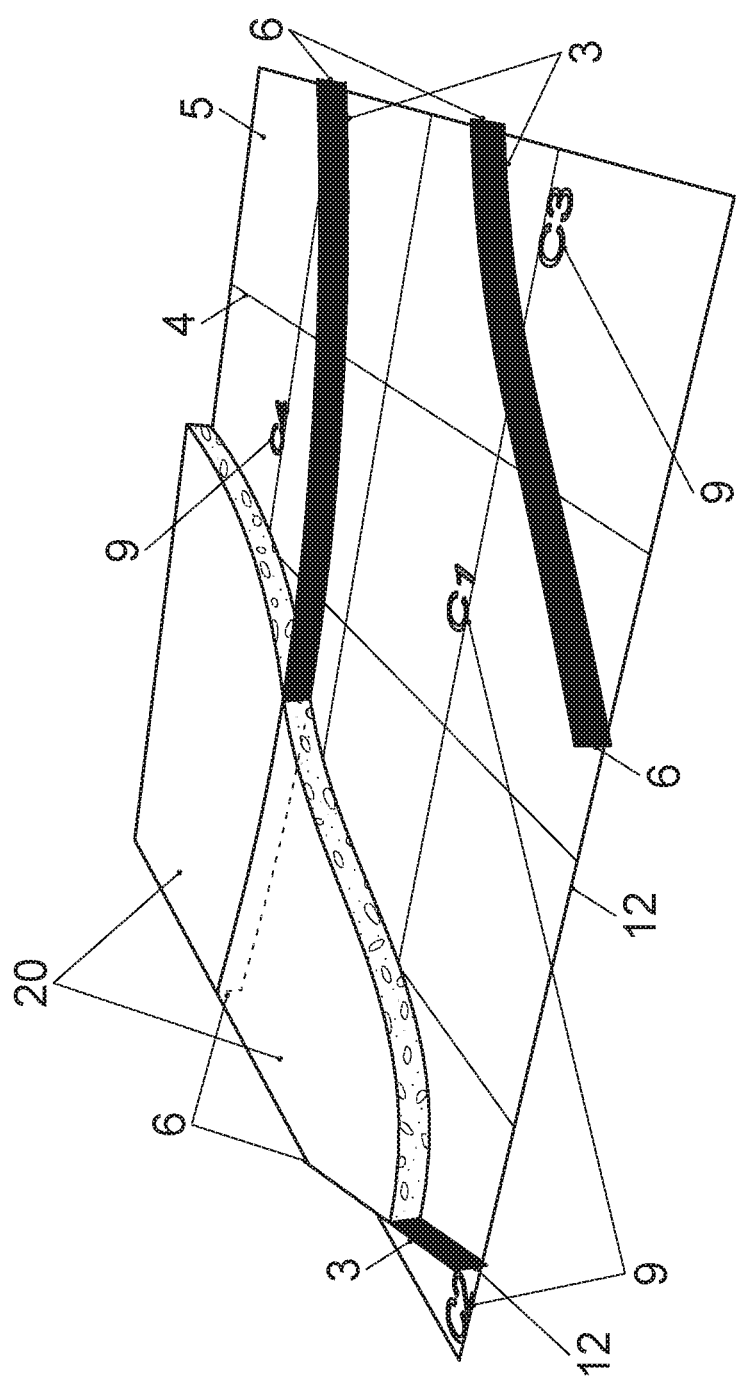
FIG. 2 a schematic overview of a surface covering product with filling composition indication.

In FIG. 2, a single tile 5 with boundary walls 3 is shown. The tile 5 here was a base network 4 and the boundary walls 3 are in this example completely attached to the base network, and in fact these are here formed as one part in the 3D printing process. The 3D printing process forms the tile in fact adding layer by layer.

In the embodiment of FIG. 2, the base network has an indication incorporated in the base network that indicated the filling composition to be used for filling the specific surface part enclosed by boundary walls 3. This filling composition indication 9 is in this embodiment a visually discernible indication, assisting persons that apply the filling composition to apply the right filling composition. Thus, for instance, a color can be used for indicating the color of a filling composition that needs to be used. The filling composition indication can also indicate the color in words, color codes, and the like. The filling composition indication may also comprise a patch of material that is machine readable. It may include, for instance, and RFID (radio frequency ID). Such an indication may be read using a reading device, and can help when for instance automated filling is applied. The filling composition indication can be produced in the same process with the base web 4 and the boundary wall 3. In the same 3D printing process, the base web, the filling composition indication and the boundary walls can be printed. An RFID device may be inserted during or shortly after 3D printing, inserting it in the 3D printed material, for instance.

The tile 5 is in this embodiment rectangular, even square. As already indicated, any shape can be used, also irregular and non-repeating shapes of the tile may be used. The tile 5 has borders 12 forming a periphery of a tile 5. The borders 12 can be shaped in such a way that they can be connected or interlock with neighbouring tiles. The boundary walls 3 have outer ends 6 that here end at tile borders 12. There, the outer ends can be coupled with outer ends of boundary walls of a neighbouring tile in order to continue a boundary wall 3.

The base web 4 shown so far is schematically indicated as a true grid. A tile 5 with such a base web 4 can be placed on the surface, like a floor, and if necessary easily be attached to it, and a filling composition, like terrazzo, can be added.

Once the filling composition is set, the surface of the filling composition can be polished. The boundary walls 3 can then be present to provide an accent and visible boundary between filling composition areas. Alternatively, the thickness or color can be selected in such a way that the boundary is almost to completely invisible. The boundary wall material may be transparent, for instance. Alternatively, the upper end (i.e., the end remote from the surface) of a boundary wall may end in a very small thickness, running for instance tapered or with a much-reduced thickness, such that it is almost invisible.

Figure 3:
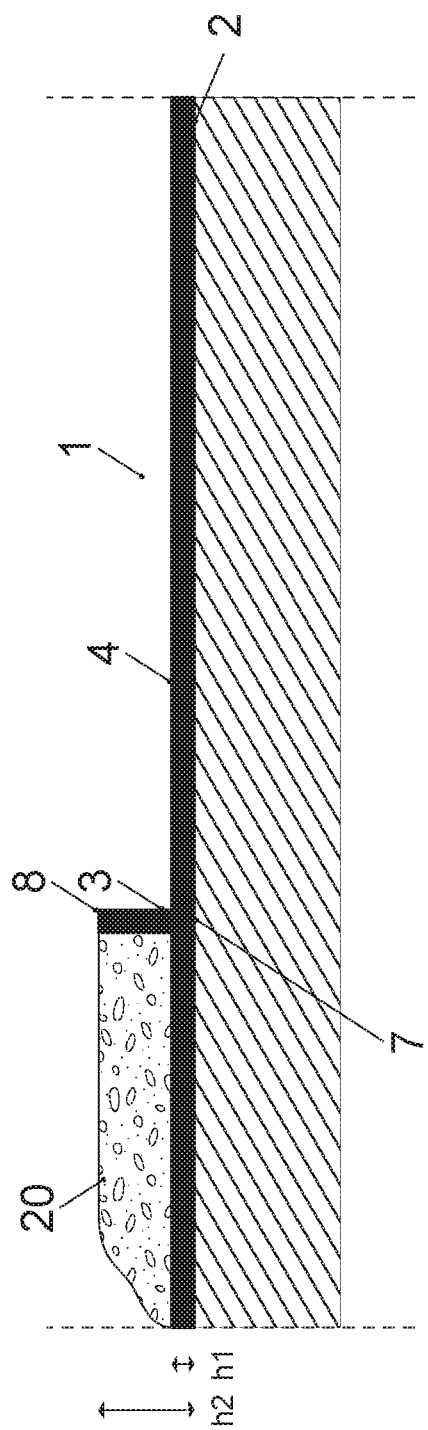
FIG. 3 a cross section as indicated in FIG. 2.

In FIG. 3, a cross section of the tile of FIG. 2 is shown. This cross section, however, may also be from a surface covering product that has a continuous network layer instead of tiles. The base network or base web 4 in this embodiment forms an open web or netting. This allows the filling composition to be in contact with and even attach to the surface below. Alternatively, the base network or base web 4 is a continuous layer, covering the surface and preventing the filling composition to contact the lower surface. In such an embodiment, the base web 4 may need to be attached to the surface or it may, during manufacturing, get attached to the surface.

In an alternative embodiment, described below, an embodiment is described that does not have or require the base web 4.

In the embodiment shown, the base network or base web 4 has a lower surface that rests on the surface of the surface to be covered. The boundary walls 3 are formed continuous and onto the base web 4. Here, the lower end of the boundary walls 3 are in fact merged with the base network 4. The base network 4 has a thickness h1. It in this embodiment this extends about a height h1 above surface 2. The boundary walls 3 have an upper end 8 that extends a height h2 above the surface 2. The filling composition usually is applied up to just below, flush with, or even a little higher that the height of the boundary wall.

In an embodiment, a height h2 of the boundary walls 3 is up to 60 cm. The larger heights may for instance be used when the boundary walls are integrated in a structural floor. In an embodiment, the height h2 is below 10 cm. In applications where the surface 2 is the surface of a floor in a building, the height h2 can be between 0.2 and 3 cm. For application in for instance terrazzo floors often a height h2 is between 0.5 and 2 cm. The specific height often depends on the nature of the filling composition. The height h1 of the base web 4 usually is relatively thin. In most applications, the height h1 is below 1 cm. In order to provide consistency and strength, the thickness h1 is often 0.1 cm or more. This also depends of that nature of the material from which the base web 4 is produced.

A lower range of a thickness of the boundary wall is limited by the thickness at which the boundary wall can be produced, in combination with its specific application. In most applications, a thickness of the boundary wall 3 will be at least 0.1 mm. It allows the boundary wall to separate different types or embodiments of filling composition. When used in for instance terrazzo floor designs, the thickness often is between 0.1 cm and 1.2 cm. In an embodiment, the thickness or width of the boundary walls may vary along a length of a boundary wall. This can provide or support design features, or for providing some desired properties.

In an embodiment, not illustrated, the lower end or the boundary walls 3 rest on the surface, and the base web 4 connects boundary walls 3 with one another, ensuring exact positioning. The base web 4 can in such an embodiment for instance have a lower surface that is up the boundary walls, but which ends below the upper end or the boundary walls. Thus, the base web 4 will be covered by the filling composition.

In an alternative embodiment, the lower end of the boundary walls 3 and the base web 4 may be provided with corresponding snap fit provisions that allows the boundary walls 3 to be snap-fitted onto base web or base network 4.

Figure 4:
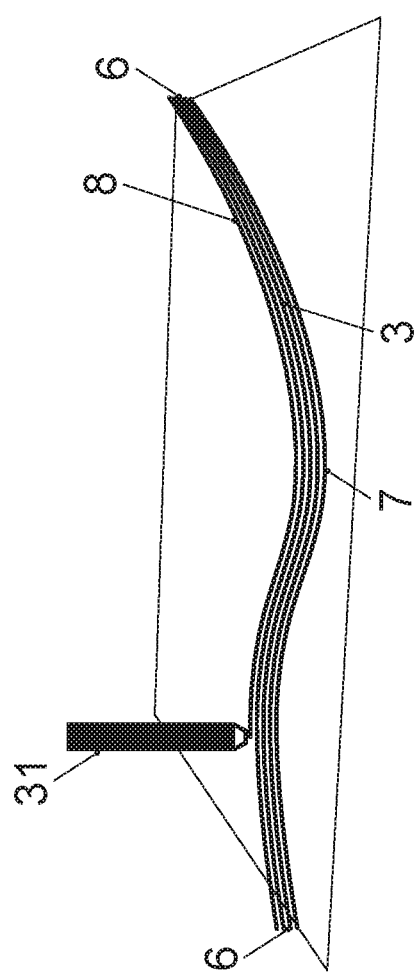
FIG. 4 a schematic view of a 3D printing process for printing a boundary wall, and FIG. 5A a schematic view of spaced boundary walls for providing an expansion joint.

In FIG. 4, schematically the 3D printing of a boundary wall 3 is illustrated. In a 3D printing process, in an embodiment the height of the boundary wall 3 is formed by building the boundary wall 3 up layer by printed layer. Other printing techniques that allow forming or boundary walls that each time are different may be considered. In an embodiment, the boundary walls 3 are directly 3D printed on the surface to be covered. The may for instance be done using one or more 3D printing devices that print the boundary walls 3 directly on the surface to be covered. These 3D printing devices may for instance be displaceably over the surface to be covered. In this way, the boundary walls and other features discussed in tis description may be produces in-situ.

As explained earlier, different production techniques are considered. As described, the base web 4 and the boundary walls 3 can be produced as one piece. Alternatively, the base web 4 and the boundary walls 3 are produced as separate parts. In such an embodiment, the boundary walls 3 and the base web 4 may be provided with wall coupling provisions.

In one technique, a base network or base web 4 is provided that may cover the complete or part of the surface to be covered. Such a base web 4 may be produced using any known technology for producing a web. In an embodiment, such a base web 4 is made from a polymer material, in an embodiment the same material as the boundary walls 3. The base web 4 may also be produced in similarly shaped tiles 5 in a mass production process. In these embodiments, the boundary walls can be produced in a 3D printing process and can be applied in the base web, attaching the boundary walls 3 using snapping provisions, or for instance by heat welding, or even by gluing the boundary walls 3 on the base web 4. The boundary walls can be 3D printed in long parts. In an embodiment, a design of boundary walls 3 is divided into parts that when produced form tiles 5. These tiles 5, that can be each have a different shape, can be 3D printed. The tiles of connected boundary walls 3 can be attached, coupled or connected onto the base web 4 or directly on the surface of the surface to be covered, and subsequently filling compositions can be used to fill enclosed areas. Thus, for instance terrazzo floors with regular or irregular patterns or images can be formed. The outer ends 6 of the boundary walls 3 of neighbouring tiles can be mutually connected to prevent filling composition 20 to leave the enclosed areas and mix with filling compositions 20 of other, neighbouring closed areas. The coupling of the boundary walls 3 to the base web 4 might also need to connect to the base web 4 in such a way that the filling composition of one enclosed area does not flow into the enclosed part of a neighbouring area. The boundary walls 3 may also for instance be printed onto such a pre-produced base web 4. This 3D printing may take place on tiles of base web 4. Alternatively, the boundary walls 3 can be directly 3D printed on for instance a length of the base web 4 while the base web 4 is already applied of when it is being applied on the surface to be covered.

In another technique, the base web 4 and the boundary walls 3 are produced in one 3D printing process. Thus, for instance, each tile 5 is formed layer by layer. In such an embodiment, the 3D printed tiles 5 are positioned on the surface to be covered at their right position. Next, the filling compositions are applied at their respective enclosed parts for forming the designed surface covering. In order to place these individual tiles 5 at their proper positions, the tiles 5 at their tile borders 12 can be provided with an indication showing which tile should be placed where, or which tile should neighbour which tile. Alternatively or additionally, the boundary outer ends may be provided with an indication identifying which boundary wall outer end should be connected or coupled to which boundary wall outer end. As explained above with respect to the filling composition indications, such indication may be visual, but also machine readable, for instance.

It was found, and is also known from literature (see citation above in the background section) that expansion joints may be needed in the filling composition, in order to release stress in the filling composition, or between the filling composition layer and for instance the surface that it covers, or to respect an existing expansion joint in the surface. Many different solutions are provided. In an embodiment of the current surface covering product, spaced boundary walls are provided, as shown in FIGS. 5A and 5B. Here the boundary walls 3, 3' run substantially or functionally parallel. These can be easily formed in a 3D printing process. In an embodiment, the tile border 12 define an expansion joint. In such an embodiment, neighbouring tiles 5 have a boundary wall 3 that follows the tile border or that may form a tile border. In such an embodiment, the tile borders 12 may provide a space 10 between the boundary walls 3, 3' of neighbouring tiles 5 via the base network 4. The space 10 can then after installing the surface covering product be filled with an elastomer or any other material that is used to take up the expansion/shrinkage.

Alternatively, the two boundary walls 3 and 3' may be printed on a single tile. This ensures that the spacing 10 is always constant, also during installation of the surface covering product on the surface to be covered. To create the separation between the boundary walls 3 and 3', that is needed to physically separate the two parts that are divided by an expansion joint, the base web layer may be cut in the space 10, between the boundary walls 3, 3', after applying the filling composition.

In another embodiment, the elastomer or other material that is used to take up the expansion/shrinkage, may be applied with the additive manufacturing machine in the same process in which the boundary walls and, if used, the base web 4 is produced. As shown in FIG. 5C, the boundary wall 3, 3' may comprise two different materials. The side of the boundary wall 3, 3' that is touching the filling composition, is made from the same material as boundary walls that are not part of an expansion joint. The other side of the boundary walls 3, 3' is made from an elastomer 13 or any other material that is used to take up the expansion/shrinkage, and that can be applied with the same additive manufacturing process. In such an embodiment boundary wall 3, 3' follow the tile borders 12 or they may form the tile border. When two neighbouring tiles are put next to each other on the surface, the adjacent boundary walls 3, 3' function as expansion joint.

In yet another embodiment, a boundary wall 3 may be fully produced from an elastomer 13 or any other material that is used to take up expansion/compression. The boundary wall 3 in this embodiment may be integrated with the base web, as depicted in FIG. 5D.

Figure 6:
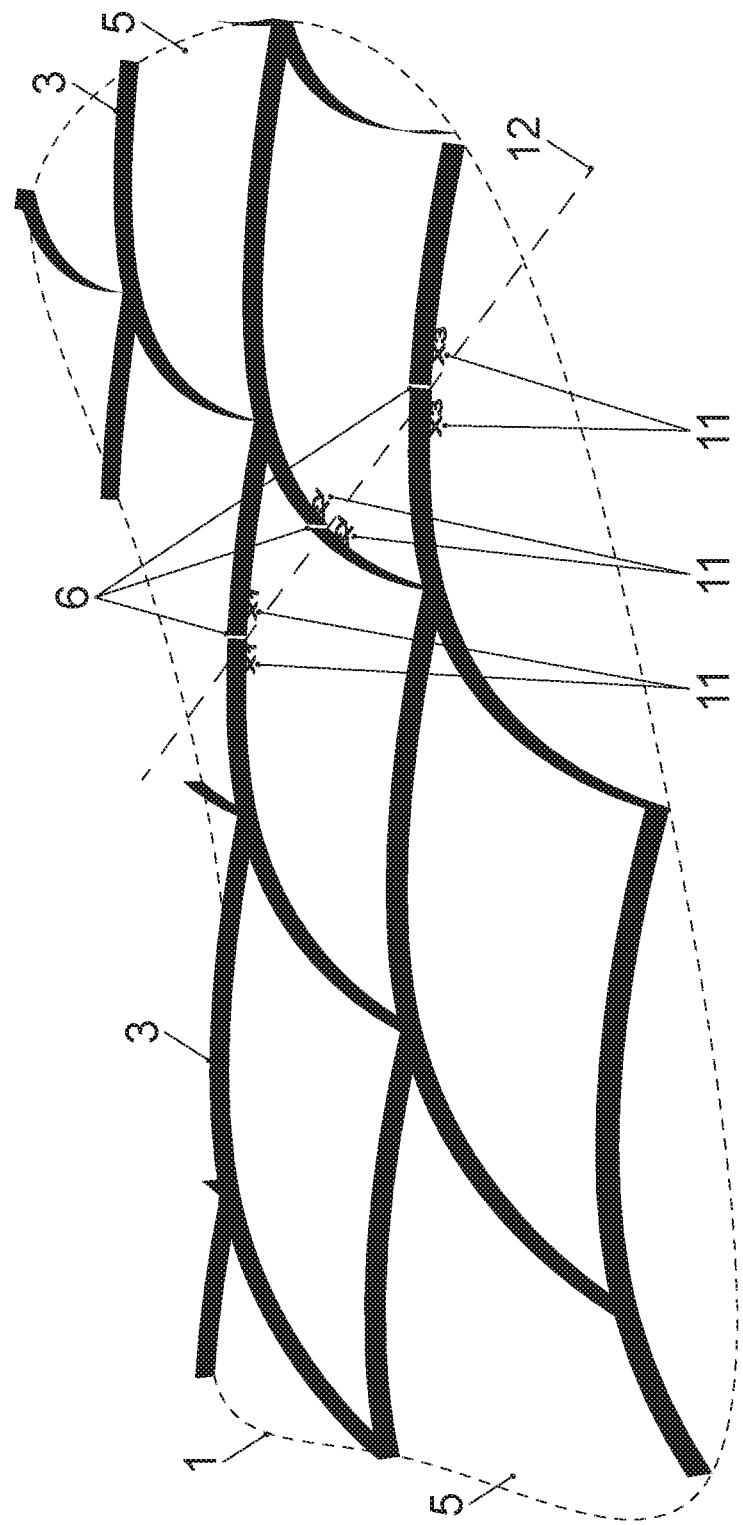

In FIG. 6, an example of a surface covering product is illustrated where the surface to be covered is divided up into surface parts and tiles 5 are formed according to these surface parts. The surface covering product here comprises coupling indications 11. These coupling indications 11 may be visual discernible coupling indications 11, as illustrated here. The coupling indications 11 may also be machine-readable indications, like for instance RFID. This may additionally be used as an indication of where on the surface a tile 5 should be placed.

The coupling indication 11 may be attached to or incorporated into a base network if provided. Alternatively or in combination, the indication can be incorporated or attached to a boundary wall 3, for instance at or near the coupling end 6 of a boundary wall 3.

In the current embodiment, in fact, the surface covering product is provided without base network 4. The boundary walls 3 are here provided in tiles or elements 5 of coherent or joint boundary wall ends. At the lower end 7 near boundary wall coupling ends 6, the coupling indications are formed together with the boundary walls.

The coupling indications show where and how the tiles or elements 5 should be coupled. The height of the coupling indications is such that they will be below the surface of the filling composition once applied. In fact, their upper surface is below the upper end 8 of the boundary walls 3.

FIG. 6 also shows how the boundary walls 3 form in this example enclosed surface parts for holding the filling composition 20.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

REFERENCE NUMBERS 1 surface to be covered
2 surface
3 boundary wall
4 base network
5 surface tile
6 coupling/outer end of boundary wall
7 lower end of boundary wall
8 upper end of boundary wall
9 filling composition indication
10 boundary wall spacing for expansion joint
11 coupling indication for neighbouring tile
12 tile borders
13 elastomer for expansion joint
20 filling composition
30 outer mould
31 3D printing head/3D printing device
H1 height/thickness of base network
H2 height of boundary wall

The invention claimed is:

1. A method for producing a terrazzo flooring design on a flooring surface, comprising:
   providing a base web that comprises two or more tiles;
   3D printing boundary walls of thermoplastic material on said base web,
      wherein, when the tiles are positioned on the flooring surface, said boundary walls form enclosed surface parts, and provide a boundary for filling compositions in said enclosed surface parts that prevents mixing of filling compositions of neighboring enclosed surface parts;
   applying said base web with said boundary walls onto said flooring surface;
   covering said base web and at least part of said boundary walls with said filling composition;
   once said filling compositions are set, grinding or polishing a surface of said filling composition, wherein after the grinding or polishing, upper ends of the boundary walls are visible, forming said terrazzo flooring design.

2. The method of claim 1, further comprising dividing said base web into the tiles, and
   wherein applying said base web comprises tiling said flooring surface with said tiles, and
   wherein said dividing said base web into tiles comprises designing a layout of said boundary walls,
      dividing the flooring surface into surface sections determining individual tiles, and
      designing a set of tiles providing a tessellation of said flooring surface, and
      3D printing said set of tiles.

3. The method of claim 1, wherein said boundary walls define a lower face that faces the flooring surface, and the upper ends of said boundary walls extend up to 60 cm from said lower face.

4. The method of claim 3, wherein said base web comprises an upper surface below said upper ends of said boundary walls, and a lower surface that in use rests on said flooring surface.

5. The method of claim 1, wherein said base web is formed in said 3D printing process for forming said boundary walls or said base web and said boundary walls are 3D printed from the same material.

6. The method of claim 1, wherein said base web and said boundary walls are from different material.

7. The method of claim 1, wherein said boundary walls are part of the tiles that are formed in said 3D printing process, wherein said tiles have borders connecting neighboring tiles, and wherein, when the tiles are positioned on the flooring surface, at least one of said boundary walls continues from one tile to a next to form a connected wall that crosses one of the borders between the neighboring tiles.

8. The method of claim 7, wherein at said borders said boundary walls comprise wall coupling provisions for coupling said boundary walls with boundary walls of neighboring tiles.

9. The method of claim 1,
   wherein said flooring surface is divided into surface sections, wherein said boundary walls are part of the tiles that are formed in said 3D printing process, and wherein a tile perimeter of each of said tiles is formed according to one of said surface sections for allowing forming said tiles covering said flooring surface, forming a tessellation of said flooring surface.

10. The method of claim 1, wherein said tiles have borders connecting neighboring tiles, and wherein one of said boundary walls forms at least one tile border of one of said tiles.

11. The method of claim 1, wherein said tiles comprise tile coupling provisions for coupling said tiles together, and wherein said tile coupling provisions provide matching boundary walls at tile perimeters.

12. The method of claim 1, further comprising providing a set of the tiles having a perimeter adapted for providing an irregular, non-repeating tessellation of said flooring surface.

13. The method of claim 1, further comprising providing a series of the tiles for tessellation of said flooring surface, each tile covering part of the flooring surface, wherein said surface covering tiles comprise the base web for application on said flooring surface, and the boundary walls extending from said base web.

14. The method of claim 1, wherein said boundary walls have a height of less than 10 cm, or wherein said boundary walls have a height of between 0.2 and 3 cm.

15. The method of claim 1, wherein said boundary walls have a first thickness at a first height located below the upper ends, and a second, smaller thickness at the upper ends.

16. The method of claim 1, further comprising:
receiving a floor layout at a computing system having a processor and a memory;
designing said terrazzo flooring design using the computing system, wherein the designing includes:
selecting said filling compositions, and
defining said boundary walls providing a separation of said filling composition, visible ornaments, and a combination thereof, and
providing, via the computing system, based upon said terrazzo flooring design and said floor layout, production instructions for a 3D printing device to produce tiles comprising said base web holding said boundary walls,
wherein said tiles provide a tessellation of said floor layout and when produced and applied onto said flooring surface allow said covering with said filling compositions for forming said terrazzo flooring design.

17. The method of claim 1, further comprising 3D printing, in or on the base web or the boundary walls, at a height below the upper ends of the boundary walls, a pre-filling indication;
wherein the pre-filling indication comprises:
a position indication that indicates a position of one or more of the tiles on said flooring surface;
a tile placement indication;
a coupling indication;
a floor heating indication indicating a positioning of a floor heating tube or wire; or
a filling code provision that indicates a filling composition to be used for filling an enclosed surface part of said enclosed surface parts; and
wherein the covering with the filling composition also covers the pre-filling indication, such that after the covering and the grinding or polishing, the pre-filling indication is not visible.

18. The method of claim 1, further comprising 3D printing, in or on the base web or the boundary walls, at a height below the upper ends of the boundary walls, a coupling provision;
wherein the coupling provision comprises:
a tile coupling provision for coupling tiles together;
a wall coupling provision;
a floor heating mounting provision for a floor heating tube or wire;
a floor heating coupling provision for a floor heating tube or wire; or
a floor heating clamping provision for clamping a floor heating tube or wire in a predefined position with respect to at least one of said boundary walls and said base web; and
wherein the covering with the filling composition also covers the coupling provision, such that after the covering and the grinding or polishing, the coupling provision is not visible.

19. The method of claim 18, wherein the coupling provision is configured as a snap fit provision.

* * * * *